Patented Apr. 13, 1943

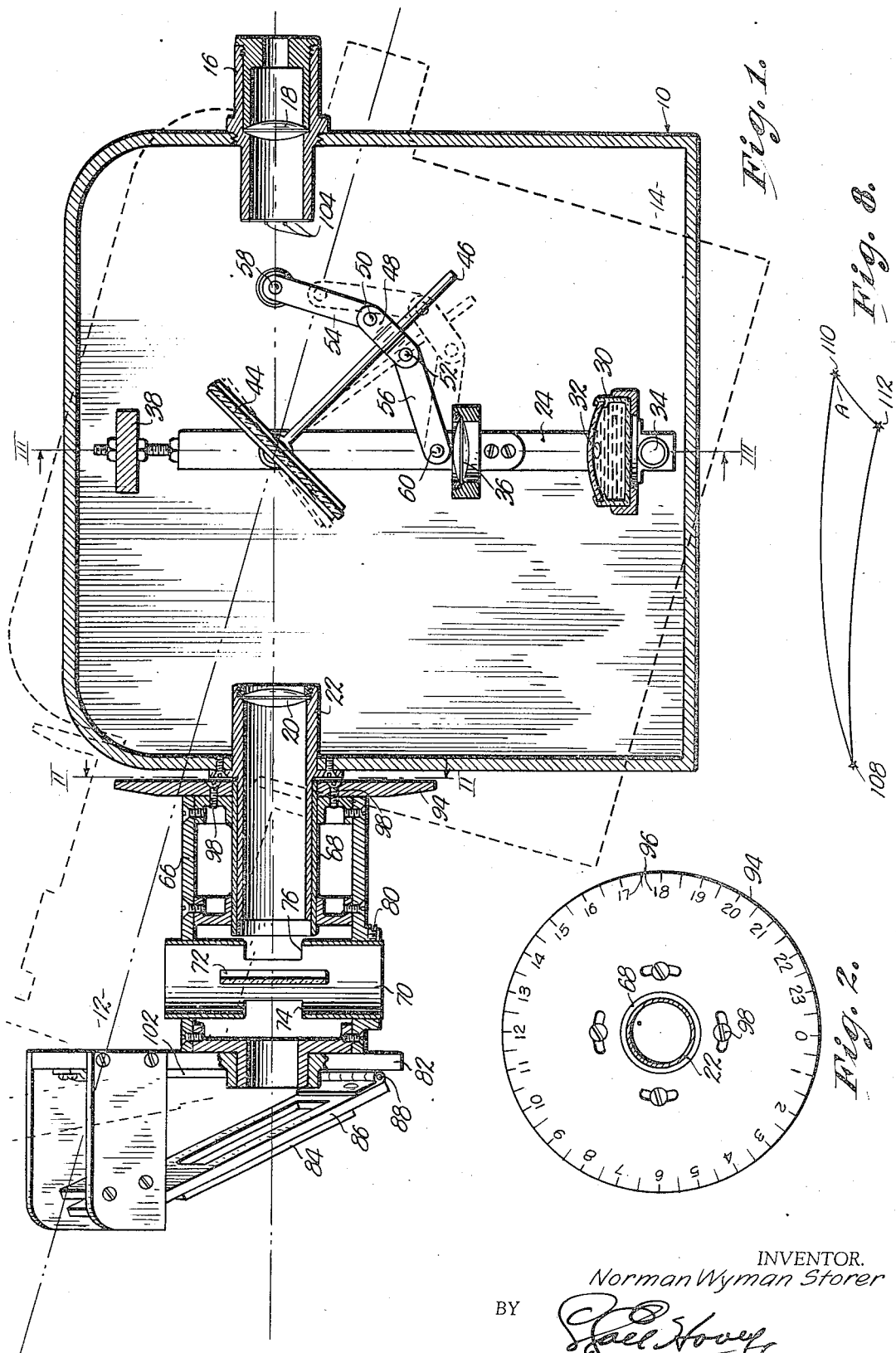

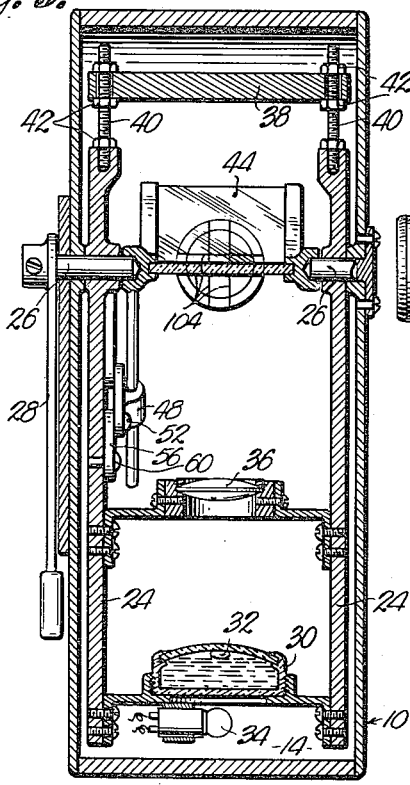
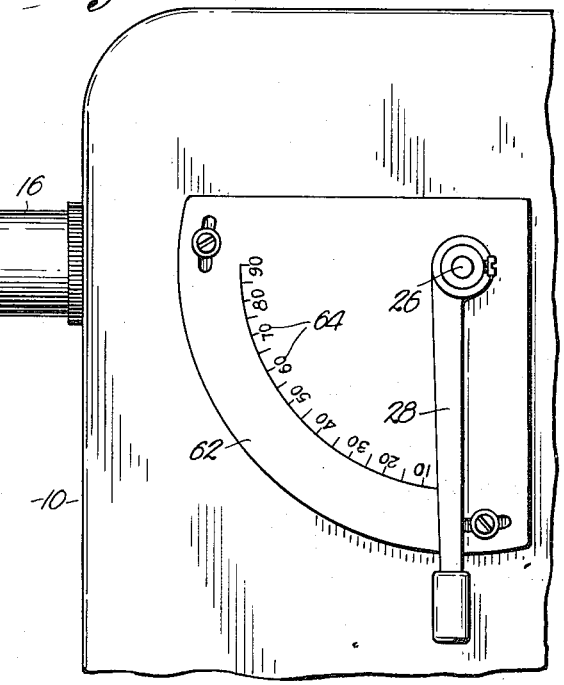
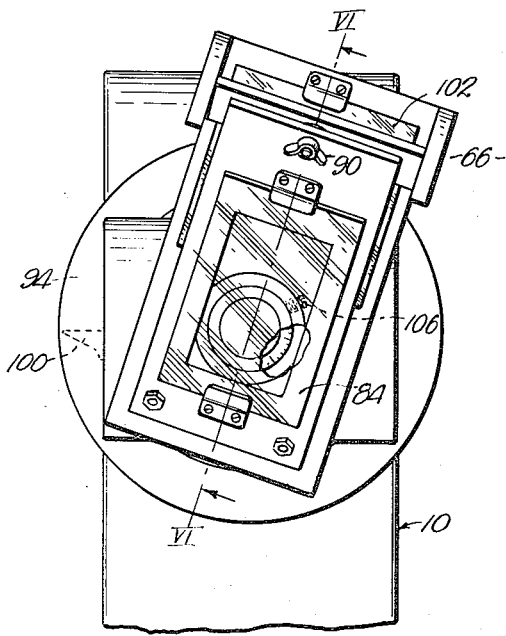
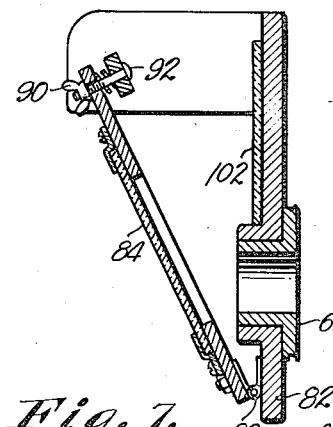
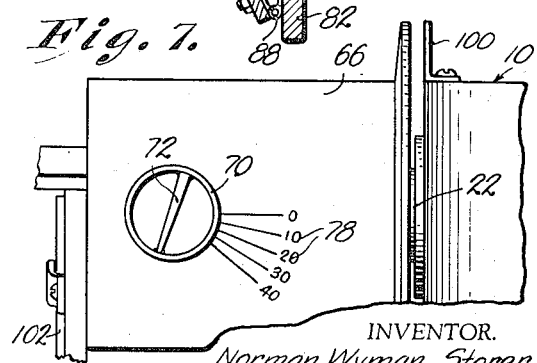

2,316,466

UNITED STATES PATENT OFFICE 2,316,466

INSTRUMENT FOR THE SIMULTANEOUS DIRECT DETERMINATION OF LATITUDE AND LOCAL SIDEREAL TIME FROM A SINGLE SETTING ON THE NIGHT SKY

Norman Wyman Storer, Lawrence, Kans.

Application October 1, 1941, Serial No. 413,188

9 Claims. (Cl. 88—2.2)

This invention relates to an astronomical instrument of the character usable in nagivation and kindred sciences where it is desirable to simultaneously determine latitude and sidereal time from a single setting on the night sky.

One of the primary aims of the instant invention is to provide an astronomical instrument of relatively simple character, usable to simultaneously and directly determine latitude and local sidereal time from a single setting and by employing two chosen heavenly bodies.

This invention has for an even further object to provide an instrument including two independent scales affording the operator with direct readings and revealing the latitude and local sidereal time after but a single setting of the instrument on the night sky.

Another aim of the instant invention is the provision of an instrument of the aforementioned character provided with structure capable of precisely orienting an axis in the instrument toward the celestial pole by superimposing the images of two selected heavenly bodies at a given point in the field of view provided in the sighting section of the instrument; one of the heavenly bodies being a bright star near the elevated pole, hereinafter called "polar star," while the other heavenly body may be any one of a number of bright stars located above the serious effect of atmospheric refractions and at a considerable angular distance from the pole, this star to be hereinafter called the index star.

Other objects of the invention include specific structural details that have been adopted for use in constructing the instrument embodying this invention, and such minor objects will appear during the course of the following specification, referring to the accompanying drawings, wherein:

Fig. 1 is a vertical central longitudinal sectional view through an instrument for determining latitude and local sidereal time, made in accordance with the present invention.

Fig. 2 is a sectional view taken on line II—II and looking in the direction of the arrows.

Fig. 3 is a vertical transverse cross sectional view through the instrument taken on line III—III of Fig. 1 looking in the direction of the arrow.

Fig. 4 is a fragmentary side elevational view of the instrument case illustrating the position of the latitude scale.

Fig. 5 is a fragmentary front end elevational view of the instrument.

Fig. 6 is a fragmentary detailed sectional view taken on line VI—VI of Fig. 5.

Fig. 7 is a fragmentary top plan view of a portion of the instrument head illustrating the prism mounting; and Fig. 8 is a diagrammatic view of the triangle on the sky, showing the two stars to be used and the true pole.

While the instrument contemplated by this invention might be constructed in many ways, the preferred embodiment illustrated in the accompanying drawings, is adequate to fully disclose to one skilled in the art, the manner in which a hand instrument may be made and the resuts obtained through its employment.

The device comprises two main units—a sighting section, broadly designated by the numeral 10, and a head, likewise designated by the numeral 12. The former is in the nature of a telescope in that there is a closed case 14 equipped with an eye-piece 16 having a lens 18 therein. The side of case 10 opposite from that supporting eye-piece 16 has an objective lens 20 mounted thereon through the medium of a barrel 22. This barrel projects to each side of the wall of case 10 and serves to support head 12 in a manner permitting adjustment as will more fully hereinafter be set down.

Case 14 has therein a frame 24 swingably mounted on opposed pintles 26, to one of which is secured a crank 28. The axis of rotation of pintles 26 must intersect and be perpendicular to the collimation axis of lenses 18 and 20. Frame 24 has elements insuring its vertical disposition, as shown in Fig. 1, and carries means for indicating the direction of gravity. In the instance illustrated, a bubble cell 30 is carried at the lower end of frame 24 to present a bubble 32, the image of which is employed when the instrument is being used.

Means for illuminating bubble cell 30 is here illustrated to be a conventional type electric lamp 34, the rays of which pass upwardly through transparent bubble cell 30 and thence to an intermediate lens 36, likewise mounted on frame 24 but above bubble cell 30 in a position where its focal point is within the field of view in the sighting section 10 when the operator is peering through eye-piece 16.

Pintles 26 are intermediate the upper and lower ends of frame 24 and a counterweight 38 mounted on the upper end of frame 24 is adjustable toward and from the axis about which frame 24 moves through the medium of screwthreaded bolts 40 and cooperating nuts 42.

A half-silvered, planar mirror 44 intersects the collimation axis of lenses 18 and 20 and likewise the axis of lens 36. This half-silvered mirror 44 is pivotally mounted on pintles 26 for independent rotation with respect to frame 24 and the reflecting surface of the mirror must be precisely on the axis of rotation.

To insure that mirror 44 will move about the axis of pintles 26 at a speed different from that of frame 24 and at one half the angular speed of frame 24 to cause the bubble cell to always appear in the same position in the field of view, mirror 44 is provided with a radially extending arm 46 equipped with a longitudinally slidable bearing 48. This bearing 48 is pivotally joined as at 50 and 52 to links 54 and 56 respectively. The outer end of link 54 is pivotally joined as at 58 to one side of case 14 while the end of link 56 remote from bearing 48, is pivotally connected as at 60 to frame 24.

One of pintles 26 carries crank 28 exteriorly of case 14 and a scale 62 having indicia 64 thereon is associated with crank 28 to directly indicate the latitude to the operator.

Head 12 includes a body 66 wherein is mounted a tube 68 in telescoped relation with barrel 22. A hollow prism housing 70 carried by body 66 in a position where its axis is transverse and intersects the axis of tube 68, has a prism 72 therein between windows 74 and 76. This prism 72 may have a small angle, depending upon the distance of the selected polar star from the true pole so that after transmission through the prism, the light from both stars 108 and 110 will be traveling in a direction as if coming from the true pole 112.

When this prism is correctly adjusted and mounted in housing 70, further rearrangement thereof due to changing polar distance of the selected polar star on account of precession, is simple, the same being accomplished merely by rotating the prism and its housing 72 and 70 respectively about the axis of housing 70 that is parallel to the apex of prism 72. As shown in Fig. 7, a scale having indicia 78 is marked directly on body 66. Set screw 80 is employed to clamp housing 70 in place. When such a prism is used it will cause a deviation of the transmitted beam of light equal to the angular distance of the selected polar star from the true pole.

Holder 82 rotatably mounted on body 66, as shown in Fig. 1, has a half-silvered mirror 84 supported in a mounting 86 hingedly connected as at 88 to holder 82 and arranged at an angle intersecting the collimation axis of lenses 18 and 20 in sighting section 10. The angle of inclination of mounting 86 may be varied by manually manipulating thumb-nut 90 on bolt 92 provided for the purpose.

Full silvered mirror 102, likewise mounted on holder 82, serves to reflect the image or light of the index star, toward mirror 84 from whence it is reflected through prism 72 and objective lens 20. The angle between mirror 84 and mirror 102 is one-half the angle between the stars being employed. The focal point of lens 20 is at the plane of the inner end of eye-piece 16 across which is stretched, spaced apart vertical and horizontal hairs 104. The focal point of lens 18 is also at this plane and the image of the bubble is likewise on this plane due to the arrangement of lens 36 and mirror 44.

A plate 94 having indicia 96 thereon is secured to body 66 through the medium of bolts or the like 98 and a pointer 100 cooperates with plate 94 in designating to the operator the sidereal time which is directly indicated by indicia 96 on plate 94.

When it becomes desirable or necessary to employ a different index star, holder 82 may be removed and another having a different angle between its mirrors placed in its stead. This new holder is set at the proper angle with respect to body 66 when applied. Likewise, if another polar star is to be employed, body 66 may be replaced by another in which prism 72 is appropriately selected and adjusted to the polar distance of the polar star used.

The plane perpendicular to mirrors 84 and 102 in operation, must be coincident with the plane of the great circle connecting index star 108 and polar star 110.

The plane perpendicular to the apex of prism 72 is, in operation, coincident with the great circle connecting the polar star 110 to the true pole 112. Accordingly, the angle between the longitudinal, medial plane of holder 82 and a plane perpendicular to the apex of prism 72, must equal angle A of Fig. 8.

Holder 82 is rotated about the axis of its pivotal support from time-to-time for the purpose of adjusting the angle between holder 82 and body 66 as angle A (Fig. 8), is changed by precession. Set screw 106 is employed to maintain holder 82 in place.

Scale 94, provided with slots for the reception of screws 98 may be adjusted with respect to the plane perpendicular to the apex of prism 72 in order to correct for a third effect of precession, i. e. a gradual change in the right ascension of the polar star.

In the embodiment illustrated, the instrument is arranged for use in the Northern Hemisphere. If it is to be used in the Southern Hemisphere, the indicia of scale 94 must be reversed from the order shown in Fig. 2.

Operation

To operate the instrument, the observer locates the image of the polar star 110 in the field of view when peering through eye-piece 16. Crank 28 is brought to such a position that when the instrument is bodily rotated about the collimation axis of lenses 18 and 20, the images of polar star 110 and the center of bubble 32 move to intersect each other. This coincidence must take place near the center of the field of view.

Head 12 is next rotated about its axis until the image of the index star 108 comes into the field of view. Rotation is continued until the image of star 108 passes through the image of the polar star 110 at the same instant the center of the image of bubble 32 passes over the image of polar star 110. This coincidence also must take place near the center of the field of view.

This rotation of head 12 will necessitate readjustment of crank 28, which in turn may require a second adjustment of head 12, and so on until the images of stars 108 and 110 and the center of the image of bubble 32 are superposed as accurately as possible in the field of view.

It is then known that the collimation axis of lenses 18 and 20 is directed at the true pole and the latitude and sidereal time are read directly from scales 62 and 94 respectively.

Having thus described the invention, what is claimed as new and desired to be secured by Letters Patent is:

1. In an instrument for determining latitude and sidereal time from a single setting on the night sky, a sighting section having means for indicating the direction of gravity; a scale associated with said last mentioned means including indicia designating latitude; and a head provided with another scale, including indicia designating sidereal time, and parts arranged for movement to bring the image of the polar star and one other heavenly body into superimposed relation within the field of view in the sighting section, said sighting section having an objective lens, an eye-piece lens, and a half-silvered mirror disposed therebetween, said mirror being swingably mounted and serving as means within the field of view for indicating to the operator the direction of gravity, said means for indicating the direction of gravity comprising a bubble cell within the range of the said half-silvered mirror, said mirror and bubble cell being mounted for movement about a common axis.

2. In an instrument for determining latitude and sidereal time from a single setting on the night sky, a sighting section having means for indicating the direction of gravity; a scale associated with said last mentioned means including indicia designating latitude; and a head provided with another scale, including indicia designating sidereal time, and parts arranged for movement to bring the image of the polar star and one other heavenly body into superimposed relation within the field of view in the sighting section, said sighting section having an objective lens, an eye-piece lens, and a half-silvered mirror disposed therebetween, said mirror being swingably mounted and serving as means within the field of view for indicating to the operator the direction of gravity, said means for indicating the direction of gravity comprising a bubble cell within the range of the said half-silvered mirror, said mirror and bubble cell being mounted for movement about a common axis, said mirror being provided with structure for independently moving the same about said common axis at a rate of speed different from the rate of rotation of said bubble cell whereby the mirror is always in position to reflect the bubble into the eye-piece of the sighting section.

3. In an instrument for determining latitude and sidereal time from a single setting on the night sky, a sighting section having means for indicating the direction of gravity; a scale associated with said last mentioned means including indicia designating latitude; and a head provided with another scale, including indicia designating sidereal time, and parts arranged for movement to bring the image of the polar star and one other heavenly body into superimposed relation within the field of view in the sighting section, said sighting section having an objective lens, an eye-piece lens, and a half-silvered mirror disposed therebetween, said mirror being swingably mounted and serving as means within the field of view for indicating to the operator the direction of gravity, said means for indicating the direction of gravity comprising a bubble cell within the range of the said half-silvered mirror, said mirror and bubble cell being mounted for movement about a common axis, said mirror being provided with structure for independently moving the same about said common axis at a rate of speed different from the rate of rotation of said bubble cell whereby the mirror is always in position to reflect the bubble into the eye-piece of the sighting section, said mirror and bubble cell having a lens therebetween and mounted on a frame serving to operably support the mirror and bubble cell.

4. In an instrument for determining latitude and sidereal time from a single setting on the night sky, a sighting section having an objective lens, an eye-piece lens, a common focal plane between said lenses, structure for indicating the direction of gravity and having means for designating to the operator when said structure is vertically disposed, said structure having a scale provided with a part operable by the said structure, said scale including indicia designating latitude; and a head rotatably mounted on the sighting section having a mirror for initially reflecting the light of the index star, a half-silvered mirror intersecting the collimation axis of the objective and eye-piece lenses and disposed at an angle to the first mentioned mirror, a prism between the half-silvered mirror and the objective lens, and a scale arranged on the head to have the reading thereof changed as the head is rotated to indicate sidereal time.

5. In an instrument for determining latitude and sidereal time from a single setting on the night sky, a sighting section having an objective lens, an eye-piece lens, a common focal plane between said lenses, structure for indicating the direction of gravity and having means for designating to the operator when said structure is vertically disposed, said structure having a scale provided with a part operable by the said structure, said scale including indicia designating latitude; and a head rotatably mounted on the sighting section having a mirror for initially reflecting the light of the index star, a half-silvered mirror intersecting the collimation axis of the objective and eye-piece lenses, and disposed at an angle to the first mentioned mirror, a prism between the half-silvered mirror and the objective lens, and a scale arranged on the head to have the reading thereof changed as the head is rotated to indicate sidereal time, said half-silvered mirror of the head being planar and disposed at an angle to a plane perpendicular to the said collimation axis.

6. In an instrument for determining latitude and sidereal time from a single setting on the night sky, a sighting section having an objective lens, an eye-piece lens, an element therebetween serving as a focal plane for both of said lenses, structure for indicating the direction of gravity, and a scale associated with the said structure including indicia designating latitude; and a head rotatably mounted on the sighting section having a mirror for initially reflecting the light of the index star, a half-silvered mirror intersecting the collimation axis of the objective and eye-piece lenses, and disposed at an angle to the first mentioned mirror, a prism between the half-silvered mirror and the objective lens, and a scale arranged on the head to have the reading thereof changed as the head is rotated to indicate sidereal time, said half-silvered mirror of the head being planar and disposed at an angle to a plane perpendicular to the said collimation axis, said last mentioned mirror being mounted on a holder by manually manipulatable means permitting the alteration of its angle of inclination.

7. In an instrument for determining latitude and sidereal time from a single setting on the night sky, a sighting section having an objective lens, an eye-piece lens, an element therebetween serving as a focal plane for both of said lenses, structure for indicating the direction of gravity, and a scale associated with the said structure including indicia designating latitude; and a head rotatably mounted on the sighting section having a mirror for initially reflecting the light of the index star, a half-silvered mirror intersecting the collimation axis of the objective and eye-piece lenses and disposed at an angle to the first mentioned mirror, a prism between the latter mirror and the objective lens, and a scale arranged on the head to have the reading thereof changed as the head is rotated to indicate sidereal time, said prism being carried by a housing rotatable about an axis parallel to the apex of the prism whereby to adjust the instrument periodically due to the changing polar distance of the polar star due to precession.

8. In an instrument for determining latitude and sidereal time from a single setting on the night sky, a sighting section having an objective lens, an eye-piece lens, an element therebetween serving as a focal plane for both of said lenses, structure for indicating the direction of gravity, and a scale associated with the said structure including indicia designating latitude; and a head rotatably mounted on the sighting section having a mirror for initially reflecting the light of the index star, a half-silvered mirror intersecting the collimation axis of the objective and eye-piece lenses and disposed at an angle to the first mentioned mirror, a prism between the latter mirror and the objective lens, and a scale arranged on the head to have the reading thereof changed as the head is rotated to indicate sidereal time, said mirrors being carried by a holder rotatably mounted on the body to permit periodic adjustment of the mirrors with respect to the prism due to the changing angle between great circles drawn from the polar start to the index star and true pole, as a result of precession.

9. In an instrument for determining latitude and sidereal time from a single setting on the night sky, a sighting section having an objective lens, an eye-piece lens, an element therebetween serving as a focal plane for both of said lenses, structure for indicating the direction of gravity, and a scale associated with the said structure including indicia designating latitude; and a head rotatably mounted on the sighting section having a mirror for initially reflecting the light of the index star, a half-silvered mirror intersecting the collimation axis of the objective and eye-piece lenses and disposed at an angle to the first mentioned mirror, a prism between the latter mirror and the objective lens, and a scale arranged on the head to have the reading thereof changed as the head is rotated to indicate sidereal time, said prism and scale, indicating sidereal time, being relatively adjustable to correct for the effect of a gradual change, due to precession, in the right ascension of the polar star.

NORMAN WYMAN STORER.